US012392722B2

(12) United States Patent
Pan et al.

(10) Patent No.: US 12,392,722 B2
(45) Date of Patent: Aug. 19, 2025

(54) SENSOR MODULE

(71) Applicants: Tyco Electronics (Shanghai) Co., Ltd., Shanghai (CN); TE Connectivity Solutions GmbH, Schaffhausen (CH)

(72) Inventors: Lei Pan, Shanghai (CN); Weifeng Bian, Shanghai (CN); Tian (Sam) Xia, Shanghai (CN); Rajendra Pai, Bangalore (IN)

(73) Assignees: Tyco Electronics (Shanghai) Co., Ltd., Shanghai (CN); TE Connectivity Solutions GmbH, Schaffhausen (CH)

( * ) Notice: Subject to any disclaimer, the term of this patent is extended or adjusted under 35 U.S.C. 154(b) by 267 days.

(21) Appl. No.: 17/903,351

(22) Filed: Sep. 6, 2022

(65) Prior Publication Data

US 2023/0074219 A1 Mar. 9, 2023

(30) Foreign Application Priority Data

Sep. 6, 2021 (CN) .......................... 202111036912.0

(51) Int. Cl.
*G01N 21/59* (2006.01)
*A47L 15/42* (2006.01)
*D06F 34/22* (2020.01)
*D06F 34/24* (2020.01)
*D06F 39/08* (2006.01)
(Continued)

(52) U.S. Cl.
CPC ............. *G01N 21/59* (2013.01); *G01F 23/14* (2013.01); *G01K 7/16* (2013.01); *G01K 13/02* (2013.01); *G01K 13/026* (2021.01); *A47L 15/4244* (2013.01); *A47L 15/4287* (2013.01); *A47L 15/4297* (2013.01); *D06F 34/22* (2020.02);
(Continued)

(58) Field of Classification Search
CPC ....... G01N 21/59; G01K 7/16; G01F 23/2927
See application file for complete search history.

(56) References Cited

U.S. PATENT DOCUMENTS 5,444,531 A * 8/1995 Foreman ............. A47L 15/4297
68/12.27
5,446,531 A * 8/1995 Boyer .................. A47L 15/4287
68/12.02

(Continued)

FOREIGN PATENT DOCUMENTS

CN 101940460 A * 1/2011 ............. A47L 15/22
CN 104515753 A * 4/2015
(Continued)

*Primary Examiner* — Dominic J Bologna
(74) *Attorney, Agent, or Firm* — Barley Snyder

(57) ABSTRACT

A sensor module includes a housing having a first cavity and a second cavity that are in communication with each other, a liquid level sensing module mounted on the housing and sensing liquid level related information when liquid flows into the second cavity, a turbidity sensing module mounted on a section of the housing having the first cavity, and a temperature sensing module integrated with the turbidity sensing module and sensing temperature related information of the liquid when the liquid flows into the first cavity. The turbidity sensing module includes a light transmitting unit and a light receiving unit that are located on opposite sides of the first cavity to allow light emitted from the light transmitting unit to pass through the first cavity and to be received by the light receiving unit.

19 Claims, 4 Drawing Sheets

(51) Int. Cl.
    *G01F 23/14*          (2006.01)
    *G01F 23/18*          (2006.01)
    *G01K 7/16*           (2006.01)
    *G01K 13/02*          (2021.01)
    *G01N 21/53*          (2006.01)

(52) U.S. Cl.
    CPC ............ *D06F 34/24* (2020.02); *D06F 39/087* (2013.01); *G01F 23/18* (2013.01); *G01N 21/534* (2013.01)

(56) References Cited

U.S. PATENT DOCUMENTS

| | | | | |
|---|---|---|---|---|
| 2011/0273714 A1* | 11/2011 | Pimputkar | ............... | D06F 34/22 356/442 |
| 2021/0251464 A1* | 8/2021 | Durham | ............... | A47L 15/4246 |
| 2021/0404857 A1* | 12/2021 | Rajendra | ................ | G01N 15/06 |

FOREIGN PATENT DOCUMENTS

| | | | | |
|---|---|---|---|---|
| CN | 107727578 A | * | 2/2018 | |
| CN | 209542593 U | * | 10/2019 | ............ G01N 33/18 |
| CN | 111855652 A | * | 10/2020 | |
| CN | 211697500 U | * | 10/2020 | ............ G01N 21/59 |
| CN | 213658566 U | * | 7/2021 | |
| EP | 2290148 A1 | * | 3/2011 | ........... D06F 39/004 |
| ES | 2412401 T3 | * | 7/2013 | ........... D06F 39/087 |

* cited by examiner

SENSOR MODULE

CROSS-REFERENCE TO RELATED APPLICATION

This application claims the benefit of the filing date under 35 U.S.C. § 119(a)-(d) of Chinese Patent Application No. 202111036912.0, filed on Sep. 6, 2021.

FIELD OF THE DISCLOSURE

The disclosure relates to a sensor and, more particularly, to a sensor module.

BACKGROUND

Some existing intelligent cleaning equipment (such as washing machines or dishwashers) are equipped with a liquid level sensor, a turbidity sensor, and a temperature sensor that are installed independently in different positions. The liquid level sensor is fixed near the liquid flow path to detect the liquid level by the liquid pressure. The measuring part of the turbidity sensor is inserted into the liquid flow path to detect the turbidity of the liquid. The temperature sensor is fixed in the liquid flow path to detect the liquid temperature.

The sensors are connected to a control system via different wiring. The control system automatically sets the cleaning mode of the intelligent cleaning equipment according to the measurement conditions of the three sensors. However, installing each sensor independently at different positions complicates wiring installation, which also creates wasted space.

SUMMARY

A sensor module includes a housing having a first cavity and a second cavity that are in communication with each other, a liquid level sensing module mounted on the housing and sensing liquid level related information when liquid flows into the second cavity, a turbidity sensing module mounted on a section of the housing having the first cavity, and a temperature sensing module integrated with the turbidity sensing module and sensing temperature related information of the liquid when the liquid flows into the first cavity. The turbidity sensing module includes a light transmitting unit and a light receiving unit that are located on opposite sides of the first cavity to allow light emitted from the light transmitting unit to pass through the first cavity and to be received by the light receiving unit.

BRIEF DESCRIPTION OF THE DRAWINGS

The present invention will become more apparent by describing in detail exemplary embodiments thereof with reference to the accompanying drawings, in which.

DETAILED DESCRIPTION OF THE EMBODIMENTS

Figure 1:
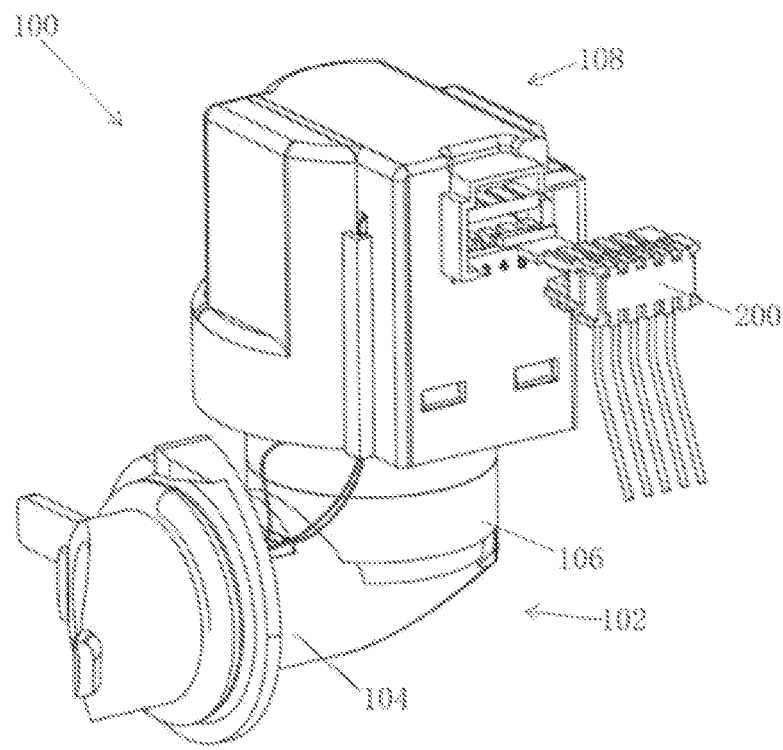
FIG. 1 is a perspective view of a sensor module according to an embodiment.

Various embodiments will be illustrated and explained hereinafter with reference to the accompanying figures. The figures serve to illustrate the basic principle, so that only aspects necessary for understanding the basic principle are illustrated. It should be noted that the figures are not drawn to scale and the use of the same reference numbers in different figures indicates similar or identical features.

Hereinafter, details of embodiments will be described with reference to the figures that form part of the invention. The figures illustrate embodiments of the invention by way of example only and the illustrated embodiments are not intended to present an exhaustive list of embodiments of the invention. It is to be understood that other embodiments may be utilized and that structural or logical modifications may be made without departing from the spirit and scope of the invention. Therefore, the following description is not intended to limit the scope of the invention, which is defined by the appended claims.

As shown in FIGS. 1-7, the sensor module 100 according to one embodiment of the present invention is used to detect liquid level, turbidity and liquid temperature of the household appliances such as washing machines and dishwashers. Specifically, as shown in FIGS. 1-7, the sensor module 100 includes a housing 102, a liquid level sensing module 110, a turbidity sensing module 112, a temperature sensing module 116, and an outer cover 108.

Figure 2:
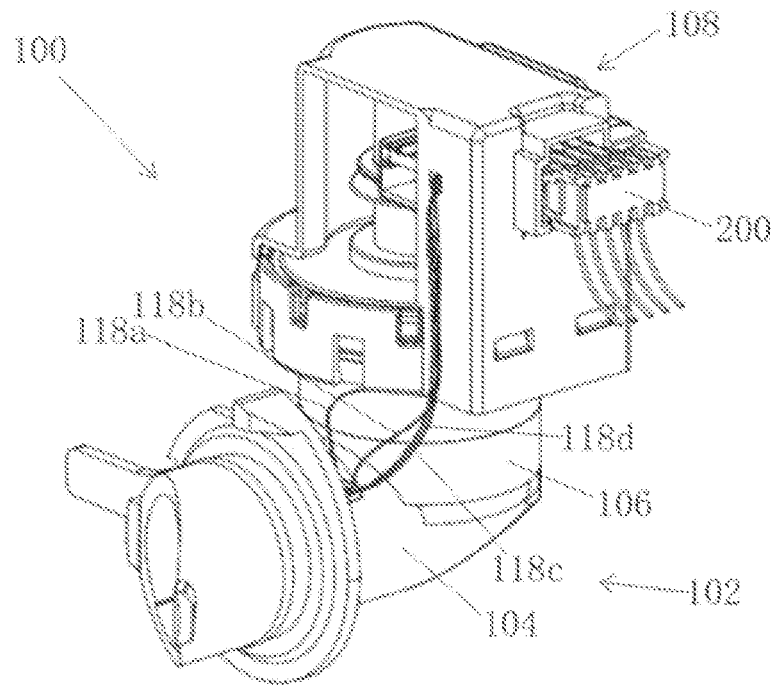
FIG. 2 is a partial sectional perspective view of the sensor module of FIG. 1.
Figure 3:
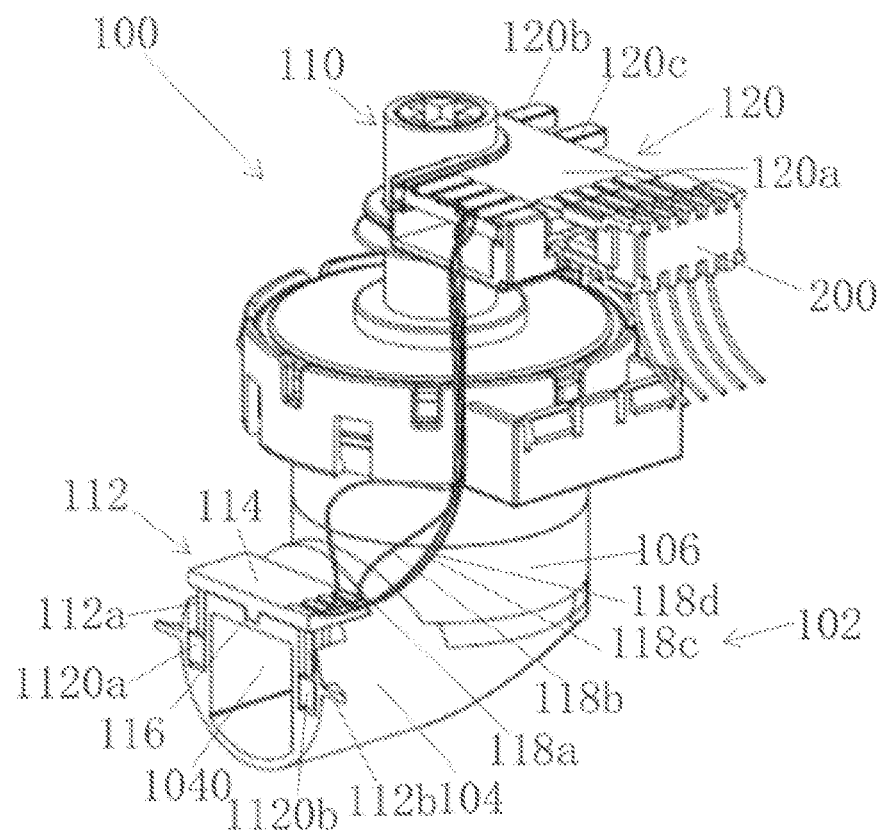
FIG. 3 is another partial sectional perspective view of the sensor module of FIG. 1, in which an outer cover is removed.
Figure 7:
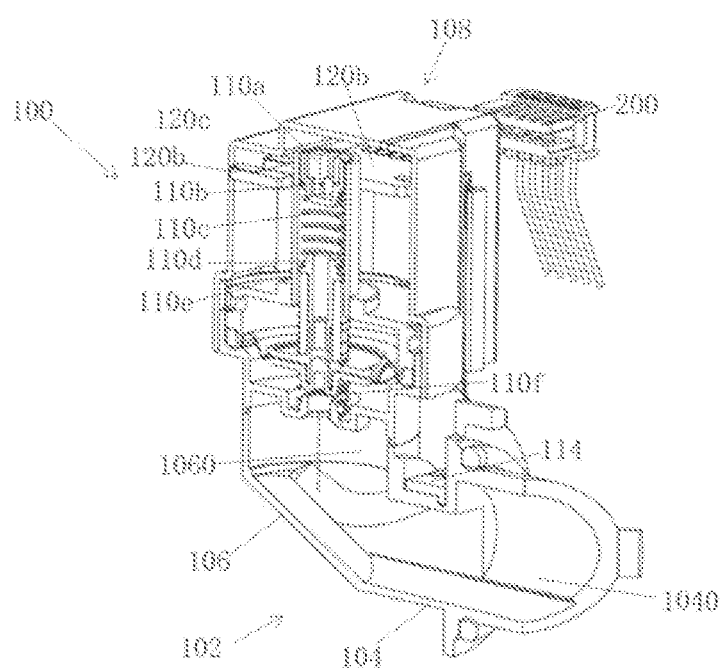
FIG. 7 is a sectional perspective view of the sensor module of FIG. 1.

The housing 102 includes a horizontal section 104 and a bending section 106, as shown in FIGS. 1-3. The horizontal section 104 includes a first cavity 1040, and the bending section 106 includes a second cavity 1060 (as shown in FIG. 7). The first cavity 1040 and the second cavity 1060 communicate with each other. The liquid level sensing module 110 is mounted on the bending section 106 and is configured to sense liquid level related information when the liquid flows into the second cavity 1060. The turbidity sensing module 112 is mounted on the horizontal section 104 to sense turbidity related information of the liquid. At least part of the horizontal section 104 of the housing 102 is transparent. An outer cover 108 of the housing 102 is adapted to the bending section 106, and is sized to shield the liquid level sensing module 110, for waterproofing and dustproofing.

Figure 4:
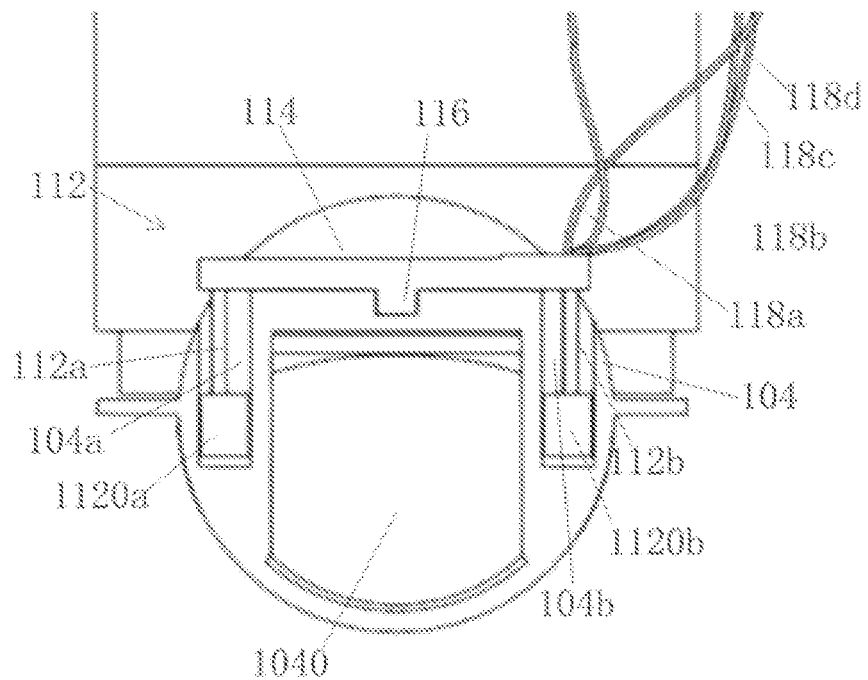
FIG. 4 is an enlarged front view of a portion of FIG. 3.

As shown in FIGS. 3-4, the turbidity sensing module 112 includes a light emitting unit 112a and a light receiving unit 112b. When part of the horizontal section 104 is transparent and the turbidity sensing module 112 is mounted on the horizontal section 104, the light emitting unit 112a and the light receiving unit 112b are oppositely located on both sides of the transparent part of the horizontal section 104, to allow the light emitted from the light emitting unit 112a to pass through the transparent part and the cavity 1040 and to be received by the light receiving unit 112b. When all of the horizontal section 104 is transparent, when the turbidity sensing module 112 is mounted on the horizontal section 104, the light emitting unit 112a and the light receiving unit 112b are located on both sides of the horizontal section 104, so as to allow the light emitted from the light emitting unit 112a to pass through the horizontal section 104 and the cavity 1040 and to be received by the light receiving unit 112b.

As shown in FIG. 4, the horizontal section 104 includes a plurality of first grooves 104a and a plurality of second grooves 104b oppositely located on both sides thereof. When the turbidity sensing module 112 is mounted on the horizontal section 104, the light emitting unit 112a is fixed in the first groove 104a, and the light receiving unit 112b is fixed in the second groove 104b. It should be understood that, in another embodiment, the horizontal section 104 could be opaque and the horizontal section 104 includes an opening penetrating through the horizontal section 104; when the turbidity sensing module 112 is mounted on the horizontal section 104, the light emitting unit 112a and the light receiving unit 112b are oppositely sealed at the opening to allow light emitted from the light emitting unit 112a to pass through the opening and to be received by the light receiving unit 112b.

In the embodiment as shown in FIGS. 3-4, the turbidity sensing module 112 further includes a first protective casing 1120a and a second protective casing 1120b. The light emitting unit 112a is accommodated in the first protective casing 1120a, and the light receiving unit 112b is accommodated in the second protective casing 1120b. When the turbidity sensing module 112 is mounted on the horizontal section 104, the light emitting unit 112a is fixed in the first groove 104a along with the first protective casing 1120a, and the light receiving unit 112b is fixed in the second groove 104b along with the second protective casing 1120b. It should be understood that, in another embodiment, the protective casings 1120a and 1120b are respectively provided with a first hole and a second hole that is paired with the first hole. When liquid (e.g., water) flows into the first cavity 1040 of the horizontal section 104, the light emitted by the light emitting unit 112a can pass through the first hole, the horizontal section 104 and the first cavity 1040, to be received by the light receiving unit 112b via the second hole. It should also be understood that in another embodiment, the turbidity sensing module 112 doesn't include the first protective casing 1120a and the second protective casing 1120b, the light emitting unit 112a and the light receiving unit 112b are directly fixed in the first groove 104a and the second groove 104b, respectively.

As shown in FIGS. 3-6, the turbidity sensing module 104 further includes a signal conversion unit such as a first printed circuit board (PCB) assembly 114. The signal conversion unit 114 is coupled with the light emitting unit 112a and the light receiving unit 112b to convert intensity signal of light received by the light receiving unit 112b into an analog voltage signal representing turbidity.

The sensor module 100 also includes a temperature sensing module 116 (e.g., NTC module), which is integrated with the turbidity sensing module 112. Specifically, the temperature sensing module 116 is integrated with the first PCB assembly 114 (e.g., the temperature sensing module 116 is soldered to the first PCB assembly 114) for sensing temperature related information of the liquid (i.e., the analog resistance value representing the liquid temperature) when the liquid flows into the first cavity 1040.

In addition, as shown in FIG. 3, the sensor module 100 also includes a connector 120, which includes a second PCB assembly 120a. The first PCB assembly 114 is connected to the second PCB assembly 120a of the connector 120 via four wires, specifically, via a ground line 118a, a power line 118b (e.g., a 5V power line), a signal line 118c for outputting the turbidity signal, and a signal line 118d for outputting the temperature signal, The connector 120 is connected to the external mating connector 200 (e.g., RAST interface connector) to send turbidity related information of the liquid sensed by the turbidity sensing module 112 and temperature related information of the liquid sensed by the temperature sensing module 116 to the outside of the sensor module.

It should also be understood that, in another embodiment, the signal conversion unit 114 may be a component capable of converting intensity signal of light received by the light receiving unit 112b into a digital signal representing the turbidity. It should also be understood that in another embodiment, the signal conversion unit 114 may be integrated in the light receiving unit 112b, so that the light receiving unit 112b converts intensity signal of light into turbidity related information via the signal conversion unit 114 integrated in the light receiving unit 112b after receiving it.

Figure 5:
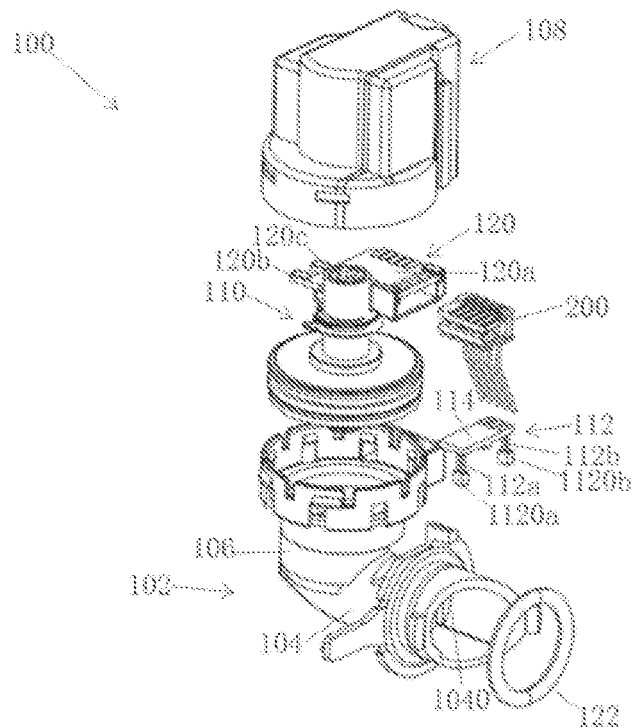
FIG. 5 is an exploded perspective view of the sensor module of FIG. 1.
Figure 6:
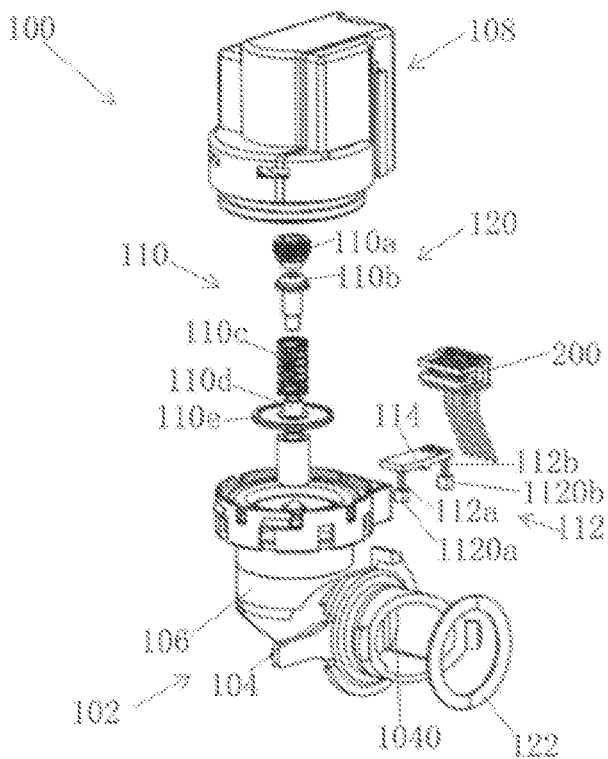
FIG. 6 is another exploded perspective view of the sensor module of FIG. 1.

With reference to FIGS. 5-7, in the illustrated embodiment, the liquid level sensing module 110 includes, for example, a calibrator 110a, a winding 110b, a spring 110c, a magnet core 110d, a diaphragm 110e and a spring 110f. The liquid pressure is converted into an analog frequency signal (i.e., liquid level related information) representing the liquid level height via a formed LC oscillation circuit. The liquid level sensing module 110 can be connected to the connection end 120b and 120c of the connector 120 as shown in FIG. 3, FIG. 5 and FIG. 7 via two wires (not shown in the figures) to transmit the liquid level related information sensed by the liquid level sensing module 110 to the external controller, for example, through the mating connector 200 matched with the connector 120.

In the embodiment shown in FIG. 3 and FIGS. 5-7, the liquid level sensing module 110 uses analog output to provide the detected liquid level height information. It should be understood that, in another embodiment, the liquid level sensing module 110 can use MEMS digital output to provide the detected liquid level height information (in this way, the liquid level related information is a digital signal representing the liquid level height), wherein the structure of the bending part and the outer cover need to be adjusted accordingly.

In the embodiment shown in FIGS. 3-7, the temperature sensing module 116 is an analog sensing module outputting an analog resistance value. In another embodiment, the temperature sensing module 116 may be a digital sensing module outputting a digital signal (the temperature related information is a digital signal representing the liquid temperature). It should be understood that, in an embodiment, the sensor module 100 may include only the turbidity sensing module 112 and the liquid level sensing module 110, but not the temperature sensing module 116.

Compared with the prior art, the sensor module 100 provided by the present invention is more compact and space-saving in structure, can reduce cost of the product, and improves the efficiency of the installation.

While the invention has been described with reference to particular embodiments thereof, the particular embodiments are provided merely as examples and are not intended to limit the scope of the invention. It will be apparent to those skilled in the art that various alterations and modifications, additions or deletions may be made to the disclosed embodiments without departing from the spirit and scope of the invention.

What is claimed is:

1. A sensor module, comprising:
   a housing including a first cavity and a second cavity that are in communication with each other;

a liquid level sensing module mounted on the housing and sensing liquid level related information when liquid flows into the second cavity;
a turbidity sensing module mounted on a section of the housing having the first cavity, the turbidity sensing module including:
a light transmitting unit and a light receiving unit that are located on opposite sides of the first cavity to allow light emitted from the light transmitting unit to pass through the first cavity and to be received by the light receiving unit; and
a signal conversion unit converting an intensity signal of light received by the light receiving unit into turbidity related information;
a first connector electrically connected to the liquid level sensing module and the signal conversion unit; and
a temperature sensing module integrated with the turbidity sensing module and sensing temperature related information of the liquid when the liquid flows into the first cavity.

2. The sensor module of claim 1, wherein the housing has a horizontal section and a bending section.

3. The sensor module of claim 2, wherein the first cavity is located at the horizontal section and the second cavity is located at the bending section.

4. The sensor module of claim 3, wherein a portion of the horizontal section is transparent.

5. The sensor module of claim 4, wherein, when the turbidity sensing module is mounted on the horizontal section, the light emitting unit and the light receiving unit are located on opposite sides of the transparent portion of the horizontal section.

6. The sensor module of claim 3, wherein an entirety of the horizontal section is transparent.

7. The sensor module of claim 3, wherein the horizontal section has an opening penetrating the horizontal section.

8. The sensor module of claim 7, wherein, when the turbidity sensing module is mounted on the horizontal section, the light emitting unit and the light receiving unit are oppositely sealed and mounted at the opening to allow light emitted from the light emitting unit to pass through the opening and to be received by the light receiving unit.

9. The sensor module of claim 3, wherein the turbidity sensing module has a circuit board on which the light emitting unit and the light receiving unit are mounted.

10. The sensor module of claim 9, wherein the circuit board is mounted on top of the horizontal section.

11. The sensor module of claim 10, wherein the horizontal section includes a first groove and a second groove located on opposite sides thereof.

12. The sensor module of claim 11, wherein, when the turbidity sensing module is mounted on top of the horizontal section, the light emitting unit and the light receiving unit are respectively fixed in the first groove and the second groove.

13. The sensor module of claim 12, wherein the turbidity sensing module further has a first protective casing and a second protective casing, the light emitting unit is accommodated in the first protective casing and the light receiving unit is accommodated in the second protective casing.

14. The sensor module of claim 13, wherein, when the turbidity sensing module is mounted on the horizontal section, the first protective casing and the second protective casing are respectively fixed in the first groove and the second groove.

15. The sensor module of claim 9, wherein the temperature sensing module is mounted on the circuit board and located outside the first cavity.

16. The sensor module of claim 2, further comprising an outer cover adapted to the bending section and sized to shield the liquid level sensing module.

17. The sensor module of claim 1, wherein the first connector is connectable to a second connector outside the sensor module to send information sensed by the sensor module to an external controller.

18. A sensor module, comprising:
a housing including a first cavity located in a horizontal section, and a second cavity that are in communication with each other, the horizontal section having an opening penetrating the horizontal section;
a liquid level sensing module mounted on the housing and sensing liquid level related information when liquid flows into the second cavity;
a turbidity sensing module mounted on the horizontal section of the housing having the first cavity, the turbidity sensing module including a light transmitting unit and a light receiving unit that are located on opposite sides of the first cavity to allow light emitted from the light transmitting unit to pass through the first cavity and to be received by the light receiving unit, the light emitting unit and the light receiving unit are oppositely sealed and mounted at the opening to allow light emitted from the light emitting unit to pass through the opening and to be received by the light receiving unit; and
a temperature sensing module integrated with the turbidity sensing module and sensing temperature related information of the liquid when the liquid flows into the first cavity.

19. A sensor module, comprising:
a housing including a first cavity located in a horizontal section, and a second cavity that are in communication with each other, the horizontal section including a first groove and a second groove located on opposite sides thereof;
a liquid level sensing module mounted on the housing and sensing liquid level related information when liquid flows into the second cavity;
a turbidity sensing module mounted on a section of the housing having the first cavity, the turbidity sensing module including:
a light transmitting unit and a light receiving unit that are located on opposite sides of the first cavity to allow light emitted from the light transmitting unit to pass through the first cavity and to be received by the light receiving unit, the light transmitting unit and the light receiving unit are respectively fixed in the first groove and the second groove; and
a circuit board mounted on the horizontal section on which the light emitting unit and the light receiving unit are mounted;
a temperature sensing module integrated with the turbidity sensing module and sensing temperature related information of the liquid when the liquid flows into the first cavity.

* * * * *